United States Patent
Chiu et al.

(10) Patent No.: US 6,900,508 B2
(45) Date of Patent: May 31, 2005

(54) EMBEDDED FLAT FILM MOLDING

(75) Inventors: Anthony M. Chiu, Richardson, TX (US); Harry Michael Siegel, Hurst, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 10/123,685

(22) Filed: Apr. 16, 2002

(65) Prior Publication Data

US 2003/0193072 A1 Oct. 16, 2003

(51) Int. Cl.$^7$ .............................................. H01L 27/14
(52) U.S. Cl. ....................... 257/414; 257/787; 257/257; 257/432; 257/116; 257/98
(58) Field of Search ........................... 257/98, 100, 116, 257/257, 414, 787, 432, 788, 433, 790, 434, 680, 435, 792, 791, 793, 794, 796, 795; 438/48, 65, 116, 112, 124, 127

(56) References Cited

U.S. PATENT DOCUMENTS

| | | | | | |
|---|---|---|---|---|---|
| 4,745,470 A | * | 5/1988 | Yabe et al. | ..................... | 348/76 |
| 5,424,249 A | * | 6/1995 | Ishibashi | ..................... | 438/51 |
| 5,446,286 A | * | 8/1995 | Bhargava | ................. | 250/361 R |
| 5,455,462 A | * | 10/1995 | Marrs | ......................... | 257/796 |
| 5,622,873 A | * | 4/1997 | Kim et al. | ..................... | 438/65 |
| 5,653,020 A | * | 8/1997 | Romano et al. | ............. | 438/106 |
| 5,701,034 A | * | 12/1997 | Marrs | ......................... | 257/706 |
| 5,897,338 A | * | 4/1999 | Kaldenberg | ................. | 438/116 |
| 6,252,220 B1 | * | 6/2001 | Jedlicka et al. | ........... | 250/208.1 |
| 6,326,228 B1 | * | 12/2001 | Hughes et al. | ................ | 438/49 |
| 6,379,988 B1 | * | 4/2002 | Peterson et al. | .............. | 438/51 |
| 6,388,338 B1 | * | 5/2002 | Romano et al. | ............. | 257/787 |
| 6,458,629 B2 | * | 10/2002 | Kobayashi | .................. | 438/127 |
| 2002/0070464 A1 | * | 6/2002 | Frezza | ......................... | 257/788 |

* cited by examiner

Primary Examiner—Donghee Kang
Assistant Examiner—Quang Vu
(74) Attorney, Agent, or Firm—Lisa K. Jorgenson; William A. Munck

(57) ABSTRACT

A flat filter layer is received between upper and lower mold portions of a mold for packaging an integrated circuit sensor device, held by the mold over and in contact with the integrated circuit's sensing surface, in light compression between the sensing surface and a mold surface. The filter layer includes slots allowing passage of injected encapsulating material to cover the integrated circuit die, with overlap portions embedded in the encapsulating material, while preventing such encapsulating material from flowing onto the sensing surface. The filter layer may be, for example, a liquid and/or light filter, and may include a protective or supportive backing. The filter is thus affixed to the packaged integrated circuit sensor device, while mold residue is reduced and mold life extended.

20 Claims, 2 Drawing Sheets

EMBEDDED FLAT FILM MOLDING

TECHNICAL FIELD OF THE INVENTION

The present invention is directed, in general, to packaging integrated circuits and, more specifically, to packaging integrated circuit sensors having an exposed sensing surface requiring protection by a filter.

BACKGROUND OF THE INVENTION

Certain types of integrated circuit sensors, such as capacitive fingerprint sensors and optical sensors for scanners, fax machines, and the like, require that a portion of the packaged integrated circuit remain exposed. The sensing surface, below which an array of (for example) capacitive electrodes or optoelectronic devices is located, generally cannot be encapsulated with the remainder of the integrated circuit, but must remain exposed in order to perform the function intended.

Sensing surfaces may, however, require protective filters. A fluid (liquid or air) filter may be required to exclude contaminants of at least a certain particle or molecular size, or a light filter excluding or passing a particular wavelength/color of incident light may be needed. Such filters should preferably be attached to the sensor integrated circuit before use (i.e., before shipping from production).

There is, therefore, a need in the art for improved methods of affixing filters to sensor integrated circuit devices.

SUMMARY OF THE INVENTION

To address the above-discussed deficiencies of the prior art, it is a primary object of the present invention to provide, for use in packaging an integrated circuit sensor device having a sensing surface, a flat filter layer received between upper and lower mold portions of a mold for packaging an integrated circuit sensor device, held by the mold over and in contact with the integrated circuit's sensing surface, in light compression between the sensing surface and a mold surface. The filter layer includes slots allowing passage of injected encapsulating material to cover the integrated circuit die, with overlap portions embedded in the encapsulating material, while preventing such encapsulating material from flowing onto the sensing surface. The filter layer may be, for example, a liquid and/or light filter, and may include a protective or supportive backing. The filter is thus affixed to the packaged integrated circuit sensor device, while mold residue is reduced and mold life extended.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 3B, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
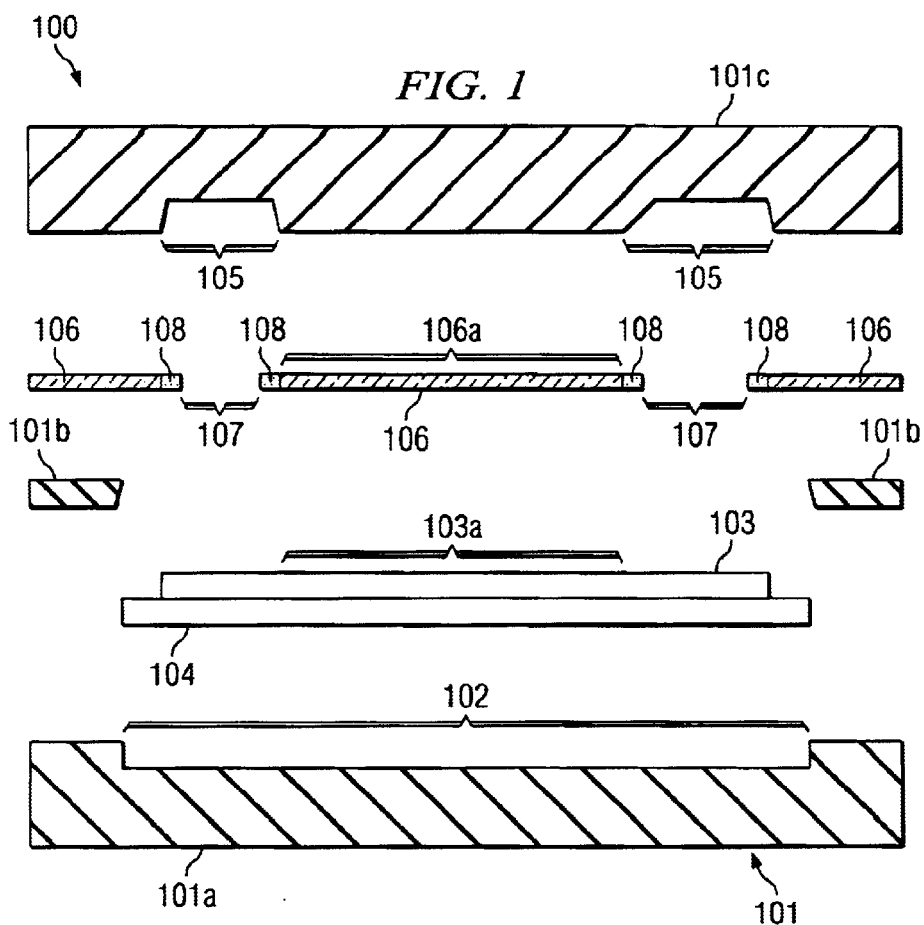
FIG. 1 depicts an exploded side cross-sectional view of a molding mechanism for affixing filters to integrated circuit sensor devices during packaging according to one embodiment of the present invention.

FIG. 1 depicts an exploded side cross-sectional view of a molding mechanism for affixing filters to integrated circuit sensor devices during packaging according to one embodiment of the present invention. Molding mechanism 100 consists of a mold 101 (hatched regions), which in the exemplary embodiment includes a bottom mold portion 101a, a spacer 101b, and a top mold portion 101c.

The bottom mold portion 101a includes an inset 102 for receiving an integrated circuit die 103 and the packaging substrate 104 on which the integrated circuit die 103 is mounted. In the exemplary embodiment, the mold 101 (particularly the bottom mold portion 101a and the spacer 101b) is designed to encapsulate only the integrated circuit die 103 and at least a portion of the upper surface of the packaging substrate 104, with the packaging substrate 104 serving as the bottom of the packaged integrated circuit.

The upper mold portion 101c includes inset(s) 105 for forming projections on the packaged integrated circuit, and is sized to provide a space around the integrated circuit die 103 (when the mold 101 and integrated circuit die 103/packaging substrate 104 are assembled) into which encapsulating material is injected. Injection passages (not shown), typically opening into inset(s) 105 allow injection of the encapsulating material (e.g., thermo-setting plastic or epoxy resin) when the mold 101 and integrated circuit die 103/packaging substrate 104 are assembled.

In the present invention, a flat filter layer 106 is positioned between the spacer 101b and the upper mold portion 101c during assembly, at the same height as and with a portion 106a in contact with the (upper) sensing surface 103a of the integrated circuit die 103 contained within the mold 101. After assembly, filter layer 106 overlies integrated circuit die 103, including any passivation or protective layers (e.g., silicon oxide, silicon carbide, silicon nitride, metal or organic material layers, etc.) formed thereon during fabrication of the integrated circuit.

The filter layer 106 is received between the spacer 101b and the upper mold portion 101c. The bottom mold portion 101a, spacer 101b, and lower mold portion 101c are adapted to hold filter layer 106 at the same height as the sensing surface of the integrated circuit die 103 when assembled. The portion 106a of filter layer 106 that contacts the sensing surface of integrated circuit die 103 also contacts a surface of the upper mold portion 101c, and may be held in light compression therebetween when mold 101, integrated circuit die 103/packaging substrate 104, and filter layer 106 are assembled.

The filter layer 106 may be a fluid filter, a light filter, or another type of filter, depending upon the sensing nature of the integrated circuit die 103 and the particular exclusion requirements (e.g., contaminants and/or filtered light). Although illustrated as a single layer, filter 106 may comprise multiple layers. In addition, filter layer 106 may include the filtering material mounted on a backing or protective layer (e.g., paper) during manufacture which is removed after completion of the molding process.

In other integrated circuit sensor device packaging schemes, a flexible material is employed to protect the active sensing surface during molding, such as a flexible material formed in-situ (within the mold) by vacuum, a screen-on gasket material on the integrated circuit sensing surface, or a cushion material attached onto the mold surface that contacts the sensing surface of the integrated circuit die. These techniques require pre-forming of the protective layer, sacrifice of integrated circuit area, and/or regular mold cleaning (which may affect mold life). In the present invention, however, filter layer 106 requires minimal pre-forming, does not require dedicated integrated circuit surface area, and, particularly with a protective backing, or special coating (either formed discretely or by impregnating the film with chemicals or enzymes) on the film, does not leave a residue in the mold.

Figure 2:
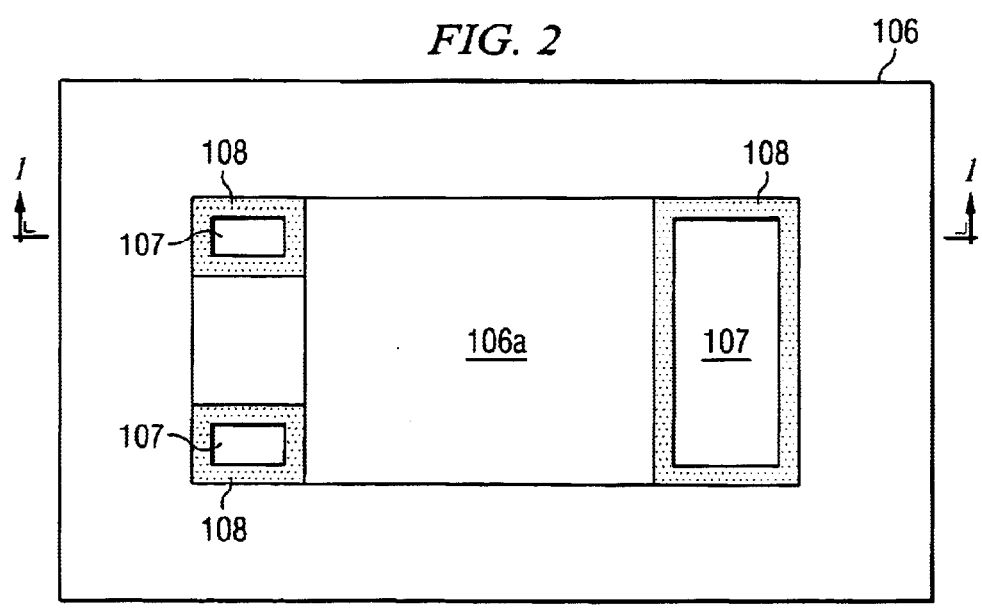
FIG. 2 is a plan view of an integrated circuit sensing surface filter layer for use in affixing filters to integrated circuit sensor devices during packaging according to one embodiment of the present invention.

FIG. 2 is a plan view of an integrated circuit sensing surface filter layer for use in affixing filters to integrated circuit sensor devices during packaging according to one embodiment of the present invention. FIG. 2 is intended to be read in conjunction with FIG. 1.

Filter layer 106 includes one or more slots 107 therethrough, allowing injected encapsulating material to pass through the filter layer 106 and contact the integrated circuit die 103. Slots 107 are surrounded by a buffer region 108 overlapping the surface portions of the integrated circuit die 103 beneath the cavities 105 within the upper mold portion 101c. After molding, the overlap areas 108 will be embedded in the molded encapsulating material, helping provide retention of the filter layer 106 in place. The portion 106a of filter layer 106 which contacts the sensing surface 103a of the integrated circuit die 103 (and a surface of upper mold portion 101c after assembly) prevents encapsulating material from being injected onto the sensing surface 103a, leaving that surface exposed after molding. After molding, excess areas of the filter layer 106 (e.g., around the periphery of the packaged integrated circuit) are removed by, for example, laser cutting. Any protective or supportive backing for the filter material within filter layer 106 may also be removed at that time.

Figure 3A:
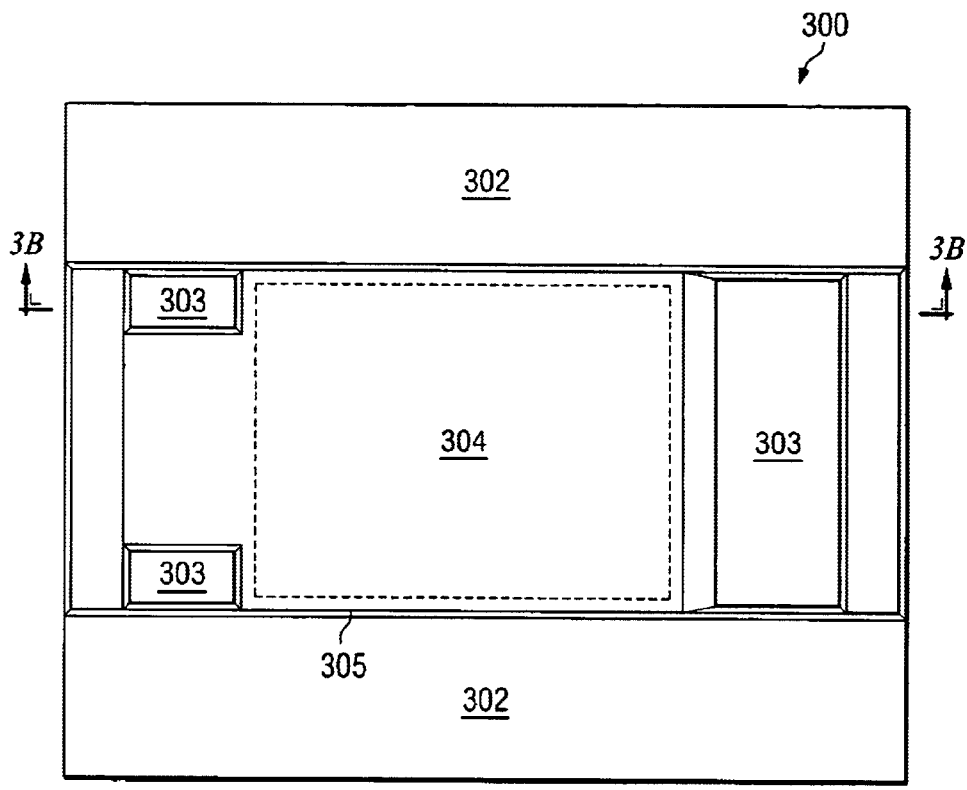
FIGS. 3A and 3B depict plan and side elevation views, respectively, of a packaged integrated circuit sensor device having a filter affixed during packaging according to one embodiment of the present invention.
Figure 3B:
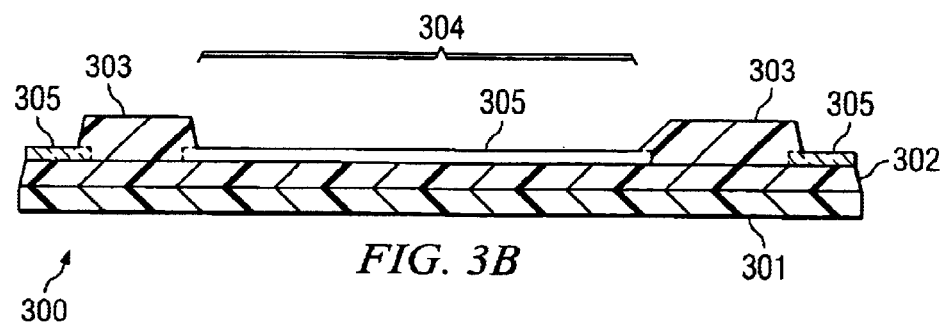

FIGS. 3A and 3B depict plan and side elevation views, respectively, of a packaged integrated circuit sensor device having a filter affixed during packaging according to one embodiment of the present invention. As noted above, the bottom of the packaged integrated circuit sensor device 300 is formed by packaging substrate 301. Encapsulation material 302 injected into the mold hardens over packaging substrate 301 and around the integrated circuit die, forming projections 303 where the upper mold portion cavities are located and leaving sensing surface 304 of the integrated circuit die exposed except for coverage by filter layer 305. Portions of filter layer 305 are embedded in encapsulating material 202, particularly in the area of projections 303.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A mold assembly for packaging an integrated circuit sensor device comprising:

a flat filter layer; and a mold adapted to receive the filter layer and an integrated circuit die having a sensing surface, the mold maintaining the filter layer in contact with the sensing surface when assembled with the integrated circuit die and the filter layer, the mold defining an enclosure into which material is selectively injected to encapsulate the integrated circuit die while leaving the sensing surface exposed except for coverage by the filter layer, wherein the filter layer has openings positioned to permit passage of the encapsulating material therethrough during injection of the encapsulating material into the mold.

2. The mold assembly according to claim 1, wherein the mold further comprises:

an upper portion and a lower portion, wherein the filter layer is received between the upper and lower portions and held in compression between the sensing surface and a mold surface.

3. The mold assembly according to claim 2, wherein the mold assembly further comprises:

a spacer between the upper and lower portions, the spacer restricting the encapsulating material to an upper surface of a packaging substrate on which the integrated circuit die is mounted during injection of the encapsulating material into the mold.

4. The mold assembly according to claim 1, wherein the openings through the filter layer are sized to create filter layer overlap regions with cavities within the mold, wherein the overlap regions are embedded within the encapsulating material after packaging.

5. The mold assembly according to claim 4, wherein the cavities correspond to protrusions on a packaged integrated circuit sensor device after packaging.

6. The mold assembly according to claim 4, wherein the overlap regions provide retention of the filter layer on the sensing surface of the integrated circuit die after packaging.

7. The mold assembly according to claim 1, wherein the filter layer comprises a fluid filtration material or a light filtration material.

8. A packaged integrated circuit sensor device comprising:

a flat filter layer having opening therethrough;

an integrated circuit die having a sensing surface, the filter layer in contact with the sensing surface; and encapsulation material surrounding at least a portion of the integrated circuit die while leaving the sensing surface exposed except for coverage by the filter layer, wherein the encapsulation material extends through the openings in the filter layer to contact the integrated circuit die.

9. The packaged integrated circuit sensor device according to claim 8, wherein the filter layer is held in contact with the sensing surface by the encapsulation material.

10. The packaged integrated circuit sensor device according to claim 8, further comprising:

a packaging substrate on which the integrated circuit die, the encapsulation material extending over only an upper surface of the packaging substrate.

11. The packaged integrated circuit sensor device according to claim 8, wherein the openings through the filter layer are sized to overlap portions of the integrated circuit die surface on which the encapsulation material is formed, wherein the overlap regions are embedded within the encapsulation material.

12. The packaged integrated circuit sensor device according to claim 11, wherein the overlap portions underlie protrusions of the encapsulation material.

13. The packaged integrated circuit sensor device according to claim 11, wherein the overlap portions provide retention of the filter layer on the sensing surface of the integrated circuit die.

14. The packaged integrated circuit sensor device according to claim 8, wherein the filter layer comprises a fluid filtration material or a light filtration material.

15. A packaged integrated circuit, comprising:

a filter comprising at least one opening;

an integrated circuit die comprising a sensing surface; and an encapsulation material operable to maintain the filter in contact with the sensing surface, the encapsulation material extending through the at least one opening of the filter and in contact with the integrated circuit die.

16. The packaged integrated circuit of claim 15, further comprising a packaging substrate, the integrated circuit die disposed on the packaging substrate.

17. The packaged integrated circuit of claim 15, wherein the filter comprises at least one buffer region, the at least one buffer region embedded within the encapsulation material so as to maintain the filter in contact with the sensing surface of the integrated circuit die.

18. The packaged integrated circuit of claim 17, wherein the encapsulation material comprises one or more projections, each of the projections formed over one or more of the buffer regions of the filter.

19. The packaged integrated circuit of claim 18, wherein the one or more projections are formed by one or more cavities in a mold into which the encapsulation material was injected.

20. The packaged integrated circuit of claim 15, wherein the filter comprises at least one of a fluid filtration material and a light filtration material.

* * * * *